United States Patent [19]

Fondriest

[11] 4,174,974
[45] Nov. 20, 1979

[54] PROCESS FOR CONVERTING COAL ASH SLAG INTO PORTLAND CEMENT

[75] Inventor: F. Frederick Fondriest, Lake Forest, Ill.

[73] Assignee: Standard Oil Company (Indiana), Chicago, Ill.

[21] Appl. No.: 896,354

[22] Filed: Apr. 14, 1978

[51] Int. Cl.² ............................ C04B 7/14; C04B 7/02
[52] U.S. Cl. .................................................. 106/103
[58] Field of Search ......................................... 106/103

[56] References Cited

U.S. PATENT DOCUMENTS

| | | | |
|---|---|---|---|
| 397,373 | 2/1889 | Lesley | 106/103 |
| 763,685 | 6/1904 | Marsden | 106/103 |
| 769,467 | 9/1904 | Brown | 106/103 |
| 1,004,380 | 9/1911 | Daher | 106/103 |
| 1,731,189 | 10/1929 | Bergquist | 106/103 |
| 2,745,657 | 5/1956 | Oster | 106/103 |
| 3,759,730 | 9/1973 | Trief | 106/103 |

Primary Examiner—O. R. Veritz
Assistant Examiner—Mark Bell
Attorney, Agent, or Firm—Thomas J. Connelly; Arthur G. Gilkes; William T. McClain

[57] ABSTRACT

Disclosed is a manufacturing process for converting coal ash slag from a slagging coal gasifier into a marketable cement product having the characteristics and qualities of portland cement. This process comprises the steps of transferring molten slag from a slagging coal gasifier to a melt chamber and reacting it with a mineral containing lime, for example: calcium oxide, calcium hydroxide or calcium carbonate, to form a homogeneous cement product. This cement product is then transferred to a quench chamber where it is allowed to cool and solidify in the form of clinkers, which are later reduced to powder form.

This process also provides an efficient means to conserve energy when producing a portland cement and provides an effective and economical way to dispose of a waste product while increasing the cost efficiency of a slagging coal gasifier.

8 Claims, 1 Drawing Figure

PROCESS FOR CONVERTING COAL ASH SLAG INTO PORTLAND CEMENT

BACKGROUND OF THE INVENTION

1. Field of the Invention

The present invention relates to a manufacturing process for converting coal ash slag into a marketable cement product having the characteristics and qualities of portland cement. This process comprises the steps of transferring molten slag from a slagging coal gasifier to a melt chamber, reacting a mineral containing lime, for example: lime, quicklime or limestone, with said slag in the ratio of one part of slag to 1.2 to 4 parts of the mineral containing lime to form a homogeneous cement product, and transferring the cement product to a quench chamber where it cools and solidifies into clinkers. After hardening, a set regulating additive, such as gypsum or anhydrite, is combined with the clinkers and this composition is ground into powder, whereby it is ready for present or future use.

2. Description of the Prior Art

Presently, the world is in a situation where energy has become a major consideration and the cost of producing it has steadily increased. Because of the foreseeable shortage of clean burning fuels, such as gas and oil, and due to the increasing cost of such fuels, more industries will have to rely much more heavily on coal as a source of energy. This greater use of coal presents both ecological and technological problems since coal usually burns less cleanly than either gas or oil. Moreover, since coal-driven locomotives and ships have almost disappeared from the scene, coal can scarcely serve at all as a fuel for vehicles. Success in exploiting the world's huge reserves of coal therefore depends on the development of a technology that will convert coal into oil and gas on a large scale. Such technology is currently available in the way of coal gasifiers, with the four principal methods being: carbonization, direct hydrogenation, extraction process, and Fischer-Tropsch Synthesis. Some of the more common types of gasifier processes in use today are: the Koppers-Totsek process, the Hygas process, the Hydrane process, the $CO_2$ Acceptor process, the Cogas process, the Coed process, the Bi-Gas process and the Atgas process. All of the above processes are described in detail in, Synthetic Fuels Data Handbook, by Cameron Engineers, Inc., Denver, Colo., copyrighted 1975, pages 177–207. This material is incorporated by reference and made a part hereof.

Generally speaking, coal gasification involves the reaction of coal, at high temperatures, with a gas containing oxygen and steam to produce a gas substantially comprising CO and $H_2$, which is suitable for use as a fuel. As a byproduct of gasification, a char or slag component is produced which must be disposed of. This disposal problem is compounded by the fact that the slag has limited value as a structural material and yet a substantial quantity is produced which must somehow be discarded. Depending upon the type and source of coal, the ash or slag content may vary from 5 to 50 percent by weight. This percentage becomes significant for a gasifier which handles 100,000 lbs./hr. In the past, slag has mainly been disposed of by merely dumping it with little consideration being given to its use for other purposes, mainly because of its limited uses. Accordingly, there is a present need and there will be a greater future need for large volume uses of coal ash slag.

One method for using coal residue has been described by Leon Jules Trief in U.S. Pat. No. 3,759,730 entitled "Process For Utilizing Coal Residues." This patent is directed to a process whereby coal residues, such as power station ash or mining waste products, are mixed with calcium carbonate and fired to about 1300° C. The fired mixture is then heated to at least about 1500° C. to transform it to a molten slag. The molten slag is quenched from about 1500° C. to form granules which are comminuted to get a pure hydraulic binder into which is incorporated a setting and hardening agent. However, the Trief patent does not teach the advantage of this invention, that being the elimination of all the energy required to heat the coal residue to the required temperature in order to form cement. Cement is one of the largest energy consuming products made today and because cement is of such a relatively low value, it is advantageous to conceive of a process which requires less energy. The Trief process demands a large amount of energy because it is utilizing coal residue which is at ambient temperature. Therefore, one using the Trief process would have to fire the slag to 1300° C. before proceeding further and this necessitates a substantial amount of energy.

As used herein, a hydraulic cement refers to a material that will harden in the presence of water and is capable of uniting particles or masses of other solid matter into a concrete mass. In the United States most of the hydraulic cement used in construction is portland cement.

Approximate compositions of hydraulic cements with major components calculated as oxides are shown in Table 1.

TABLE 1

| Type of Cement | CaO, wt. % | $SiO_2$, wt. % | $Al_2O_3$ wt. % | $Fe_2O_3$ wt. % | $SO_3$, wt. % | MgO, wt. % |
|---|---|---|---|---|---|---|
| Expansive | 63 | 19 | 7 | 4 | 4 | 1 |
| Gypsum plaster | 51 | 2 | 1 | | 39 | 1 |
| High-alumina | 38 | 5 | 38 | 13 | | |
| Hydraulic Lime | 60 | 20 | 8 | 2 | | 1 |
| Natural 45 | 25 | 5 | 4 | 2 | 10 | |
| Masonry | 50 | 15 | 5 | 2 | 2 | 3 |
| Oil Well 63 | 21 | 5 | 6 | 2 | 2 | |
| Portland | 64 | 21 | 6 | 3 | 3 | 2 |
| Pozzolanic | 45 | 30 | 12 | 4 | 2 | 1 |
| Slag | 50 | 26 | 12 | 2 | 2 | 1 |

Portland cement is a finely ground powder, usually gray in color, which when mixed with water, binds together other minerals (sand, gravel, crushed stone) to form concrete, the most widely used construction material. Almost one hundred percent of the cement used in construction today is "portland" or manufactured hydraulic cement—as opposed to "natural" cement widely used a century ago.

Current portland cements are classified into five separate ASTM specifications and these are as follows:

Type I For use in general concrete construction when the special properties specified for Types II, III, IV, and V are not required.

Type II For use in general concrete construction exposed to moderate sulfate action or where a somewhat lower heat of hydration is required.

Type III For use when high early strength is required.

Type IV For use when a low heat of hydration is required.

Type V For use when high sulfate resistance is required.

Portland cement can be manufactured by either the wet or dry process, the dry process being the one adapted to the materials most generally available and commonly used in the United States.

The calcareous material in the dry process is usually limestone and in the wet process marl, being chiefly calcium carbonate ($CaCO_3$) in either case. The argillaceous material contributing silica ($SiO_2$) and alumina ($Al_2O_3$) for either process can be shale, clay, cement rock (argillaceous limestone), or blast-furnace slag.

In simplified form, the dry process for producing portland cement entails the following operations: (1) preliminary grinding of dry raw materials separately, (2) proportioning, (3) pulverizing the properly proportioned mixture, (4) burning to incipient fusion forming the clinker, (5) cooling and seasoning the clinker, (6) addition of gypsum (calcined or uncalcined) for control of rate of setting, (7) grinding of the clinker to a fine powder that meets the fineness requirements for cement, and (8) storage in bins for seasoning prior to package or bulk shipment. Where the calcareous material occurs as marl, the wet process is commonly employed: (1) the marl is stored in vats as a thin mud or slurry; (2) the clay or other argillaceous material is reduced to a fine powder; (3) the ingredients are proportioned; (4) the ingredients are mixed through a pug mill, after which the burning, cooling, and seasoning, addition of gypsum to control set, final grinding, and storage are carried out as in the dry process.

The greatest energy consumption in the process of making portland cement occurs in the cement kiln where the raw feed must be raised from ambient to fusion temperature, a difference of up to 2800° F. Depending upon the efficiency of any specific cement plant, the energy required to produce a barrel of cement (376 pounds) has been variously estimated at between one half and one million BTU's. This large demand of energy directly affects the cost of the final product. A publication entitled: "Energy Use and Conservation in the U.S. Portland Cement Industry," by Robert D. MacLean, June, 1974, pages 12 and 13, which was presented to the United States Senate Committee on Commerce Public Hearing on Energy Waste in Industrial and Commercial Activities, shows the breakdown of type of fuel consumed and in what stage of the manufacturing process. This data is reproduced in Tables 2 and 3.

The total use of energy by type of fuel in the United States portland cement industry in the year, 1973 is shown in Table 2.

TABLE 2

| Type of Fuel | Energy Use |
|---|---|
| Natural Gas | 37% |
| Coal | 32% |
| Electric | 19% |
| Oil | 12% |

The relative percentage of total energy required to produce a ton of cement at each step in the manufacturing process is shown in Table 3.

TABLE 3

| | Stage of Mfg. Process | Energy Consumption |
|---|---|---|
| 1. | Kiln fuel | 86.6% |
| 2. | Grinding | 7.9% |
| 3. | Drying | 2.2% |
| 4. | Other | 2.0% |
| 5. | Raw material sources | 1.3% |

Table 3 demonstrates that the most energy-intensive step in portland cement manufacture is the kiln operation. Although electric power is required for kiln rotation, only fossil fuels are used to generate the 2700° F. temperature required to convert the raw material into clinkers.

It can readily be envisioned that a substantial energy saving can be obtained if molten slag from a coal gasifier could be reacted with a lime containing material to produce portland cement.

It is the general object of this invention to provide a process for converting coal ash slag into a usable product having the characteristics and qualities of portland cement.

It is an object of this invention to provide a process for making portland cement from the slag of a coal gasifier.

It is further an object of this invention to provide a more efficient energy saving way to produce portland cement.

It is still further an object of this invention to provide a useful method for disposing of coal slag.

SUMMARY OF THE INVENTION

This invention relates to a manufacturing process for converting coal ash slag from a slagging coal gasifier into a marketable cement product having the characteristics and qualities of portland cement. The process comprises the steps of transferring molten coal ash slag having a temperature range between approximately 2800° F. and 3600° F. from a coal gasifier to a melt chamber, reacting a mineral containing lime, for example lime, quicklime, or limestone, with said slag in the ratio of 1 part of slag to 1.2 to 4 parts of said mineral containing lime to form a homogeneous cement product having a temperature range between approximately 2200° F. and 2800° F., transferring said cement product to a quench chamber wherein said product cools and solidifies in the form of clinkers, and adding a set regulating additive, such as anhydrite or gypsum, before the mixture is ground to powder.

This process has the advantage of providing an efficient way to conserve energy when producing portland cement and also provides an effective and economical way to dispose of a waste product while increasing the cost efficiency of a slagging coal gasifier.

DESCRIPTION OF THE PREFERRED EMBODIMENT

Figure 1:
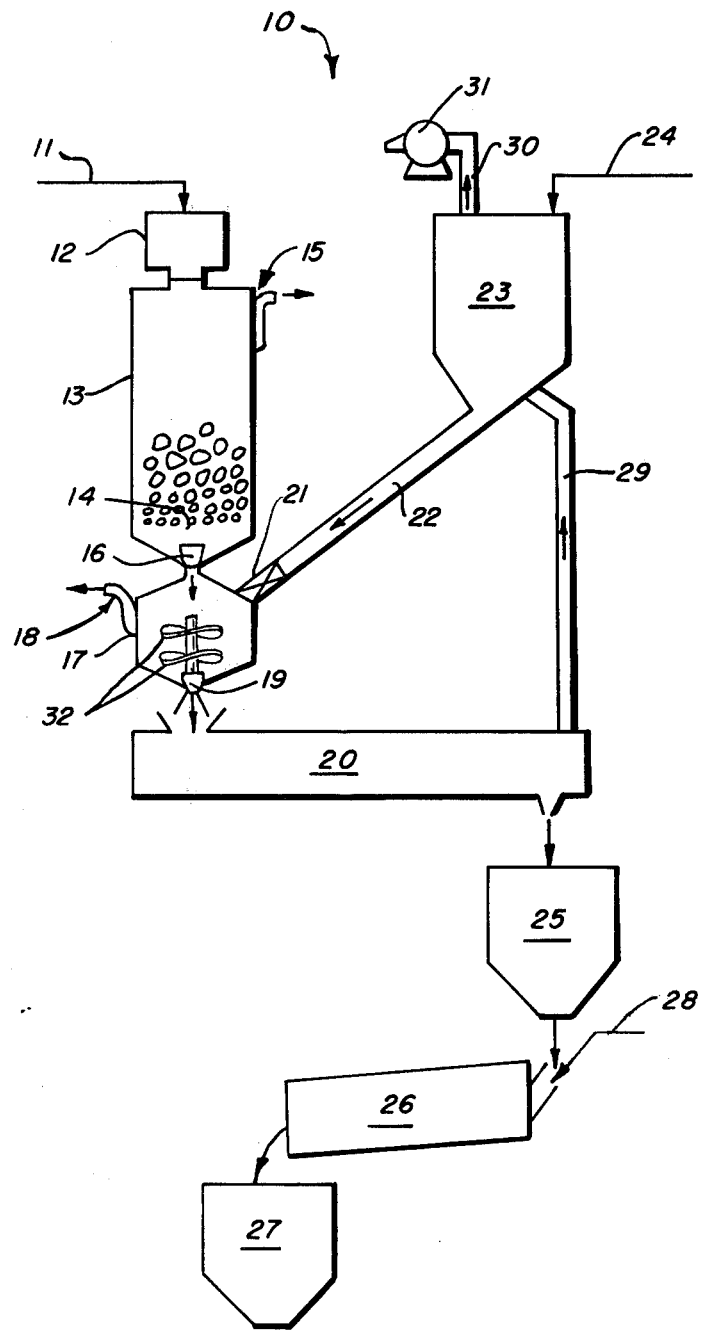
FIG. 1 is a schematic view showing the process steps of the invention.

Referring now to FIG. 1, this invention shows a manufacturing process 10 whereby coal is fed into a slagging coal gasifier reactor vessel 13 by feed input mechanism 11. Most commonly, bituminous, semi-bituminous and lignitic non-coking coals are burned or pyrolyzed in synthesis gas plants. The reason for this is that coking coals, such as those used as a reducing agent in the production of iron ore are expensive, low in volatility and are in relatively short supply. Basically, coal of the same grade as that used for steam raising or the generation of electricity are used in slagging coal gasifiers. The coal feedstocks are usually prepared by cleaning and washing in order to: lower the ash content, reduce caking, and to remove contaminants and impurities, such as pyrites. The pretreated coal arriving through feed input mechanism 11 accumulates in lock hopper 12 which is a pressurized feed mechanism and is retained there until needed by reactor vessel 13. When needed, the coal is supplied to reactor vessel 13 wherein the coal is burned or pyrolyzed under pressure in order to convert it to synthesis gas. During this process, the heavy hydrocarbons; those having a carbon to hydrogen atomic ratio of 1 to 2 or higher, are converted to methane which has a carbon to hydrogen ratio of 1 to 4.

Inside reactor vessel 13, the synthesis gas containing hydrogen, carbon monoxide and carbon dioxide is adjusted in composition so that the hydrogen/carbon monoxide ratio desired for a particular synthesis is obtained. This gas is then drawn off through vent 15 and can be used for the production of ammonia, methanol, oxo-alcohols and/or synthetic hydrocarbons. The coal ash slag 14 gradually descends to the bottom portion of reactor vessel 13 and funnels downwards toward slag tap 16. Slag tap 16 is a specially designed valve which permits the controlled withdrawal of the liquid slag from pressurized reactor vessel 13. This is to insure that the synthesis process is carried out in the desired environment and for the purpose of insuring that the coal is completely burned or pyrolyzed to slag. The hot molten slag, having a temperature range between approximately 2800° F. and 3600° F., passes through slag tap 16 to melt tank 17 wherein the slag is reacted with a mineral containing lime, for example: calcium oxide, calcium hydroxide or calcium carbonate, to form a homogeneous cement product having a temperature range between approximately 2200° F. and 2800° F. The mineral containing lime that enter melt tank 17 is first accumulated in hopper 23 through input line 24. Here in hopper 23 the mineral containing lime is preheated with heated air from quench chamber 20 which is being recirculated through return line 29. The heated air is drawn up through the material in hopper 23 and out of the hopper through vent line 30 and into suction pump 31. The preheated mineral containing lime, assisted by gravity, discharges from hopper 23 through feeder tube 22 to slide valve 21. Slide valve 21 restricts the flow rate to melt tank 17 so that the slag and mineral containing lime can be properly admixed by impellers 32 within melt tank 17. During the reacting process, carbon dioxide gas is given off and is vented from melt tank 17 through vent line 18. The slag and mineral containing lime is reacted in the ratio of approximately 1 part of slag to every 1.2 to 4 parts of the mineral containing lime and preferably in the ratio of about 1 part of slag to 2.5 parts of mineral containing lime to form a conglomerate. The slag and mineral containing lime or conglomerate is stirred until a homogeneous cement product is formed at which time it is withdrawn from melt tank 17 through tap 19 to quench chamber 20. In quench chamber 20 the cement product cools and solidifies in the form of clinkers which can range in size from ¼ to 2 inches in diameter, preferably less than one inch in diameter. It is advantageous to construct quench chamber 20 so that the clinkers can be carried toward a storage facility while they are in the process of being cooled. This can be accomplished by employing a conveyor belt or a rotary screw arrangement with air or water being used as the cooling medium, preferably air. Air from the atmosphere enters quench chamber 20 along with the cement and acts as the cooling medium. The heated air is drawn off through return line 29 and is directed back to hopper 23 so it can be utilized to preheat the mineral containing lime. The clinkers are removed from quench chamber 20 and are transferred to storage bin 25 where they are retained until needed. At that time, the clinkers are combined with a set regulating additive, for example anhydrite or gypsum, which is added through input line 28 and together the mixture is transported to grinding mill 26. In addition to the anhydrite or gypsum, other compounds such as alumina, aluminum sulfate, sodium, potassium sulfate, potassium carbonate or borax can be added in the exact quantity necessary to produce other desired properties in the cement. In grinding mill 26, the clinkers, set regulating additive and any other desirable additive are reduced to powder form. The powdered cement is then transferred to storage hopper 27 and is ready for present or future use.

While the invention is described in connection with the specific examples below, it is to be understood that these are for illustrative purposes only and should not be construed as limiting the scope of this invention.

GENERAL EXPERIMENTAL PROCEDURE

In order to evaluate the use of coal ash slag from a slagging coal gasifier for use in the production of portland cement and to determine possible methods for the utilization of the heat content of the slag emerging from the gasifier, a number of laboratory tests were conducted. Molten slag having a temperature above 2800° F. was collected in a melt chamber and reacted with either quicklime or limestone in quantities necessary to convert the slag completely to portland cement clinkers. For purposes of experiment, the melt was held at 2550° F. and the ratio of slag to limestone was varied to determine what ratio would produce the best quality cement.

EXAMPLE 1

Chemical analyses and evaluation of a representative sample of coal ash slag from a commercially operated slagging coal gasifier were conducted with the results appearing in Table 4. The coal ash slag was black in color, wet to the touch, clumpy in appearance and an X-ray diffraction analyses showed it to be completely amorphous.

TABLE 4

| Analytical Data for the Slag | |
|---|---|
| Component | Percent by weight |
| $SiO_2$ | 42.94 |
| $Al_2O_3$ | 20.06 |
| $Fe_2O_3$ | 7.03 |
| $CaO$ | 24.46 |
| $MgO$ | 2.94 |
| $Na_2O$ | 0.65 |
| $N_2O$ | 1.43 |
| $SO_3$ | 2.29 |
| $TiO_2$ | 0.57 |
| $P_2O_5$ | 0.22 |
| Total | 102.59 |

Note: Values total over 100% because iron present as the metal or in the ferrous form was calculated as the higher oxide.

Nine burn tests were conducted and in burn tests 5–9 partial conversion of the mixture to portland cement clinkers occurred. In some cases undesirable amounts of free lime (CaO) were produced and remained for over 30 minutes. However, cooling, grinding and pelletizing this high free lime mixture, along with sintering it at 2550° F., caused complete reaction to portland cement compounds.

Clinkering studies showed that the ratios of silica to iron, magnesia, alkalies and other components, except calcium oxide and alumina, are those characteristic of portland cement. Also, an addition of slightly more than an equal amount of a mineral containing lime (55%) will produce a mix that is within the range of portland cement raw mixes commercially employed, except for the presence of about 2 to 5 times more alumina than ordinary. The 45:55 slag to lime mixture is, however, equivalent to that used commercially to produce a Type S (high 3 CaO.AL$_2$O$_3$ expansive) portland cement clinker which are used for making shrinkage-compensating and self-stressing cement.

Although the 45:55 slag to lime mixture produced a portland cement, various incremental amounts of limestone were burned with the slag to ascertain the range of suitable cement products. The base controlled conditions were set equal to the "as received" sample slag. This was slag containing 24.46 percent by weight calcium oxide, with no crystalline compounds and thus no presence of ordinary cementitious substances.

The slag-limestone mixtures of the nine burn tests are as follows and the cumulative results appear in Table 5.

BURN TEST 1

A mixture of 74 percent slag and 26 percent limestone was burned at 2550° F. A complete melt occurred and X-ray analysis of the cooled mass indicated no crystalline compounds.

BURN TEST 2

A mixture of 74 percent slag and 26 percent limestone was burned at 2300° F. A good sinter occurred at this temperature. The X-ray analysis, however, revealed the only crystalline substance formed was gehlenite, a noncementitious dicalcium aluminosilicate.

BURN TEST 3

A mixture of 59 percent slag and 41 percent limestone was heated at 2550° F. A partial melt occurred. The major substance formed was gehlenite, as in the previous burn, but some tricalcium silicate, an important cementitious compound, was also formed.

BURN TEST 4

The above mixture was heated at 2300° F. so that a sinter but not a melt occurred. Only gehlenite was formed. Examples 3 and 4 indicate that the noncementitious compound gehlenite begins to decompose at 2550° F.

BURN TEST 5

A mixture of 45 percent slag and 55 percent limestone, each ground to 100-mesh, was heated at 2700° F. A partial melt occurred. Portland cement minerals (dicalcium silicate, tricalcium silicate, tricalcium aluminate and some ferrite phase) were formed, along with a substantial amount of free lime (calcium oxide).

BURN TEST 6

A mixture of 31.5 percent slag and 68.5 percent limestone, both ground to 200-mesh, was heated to 2650° F. A mixture of portland cement minerals was formed, with relatively high amounts of tricalcium aluminate. No free lime was formed.

BURN TEST 7

The slag was heated to 2550° F. where it existed as a melt. To this was slowly added, with stirring, calcium oxide until the mix was 44 percent slag and 56 percent lime. The cooled mix was found to contain portland cement minerals and free lime.

BURN TEST 8

The cooled melt from Example 7 was ground, pelletized, and reheated to 2550° F. for 15 minutes. The cooled melt was found to consist entirely of portland cement minerals.

BURN TEST 9

Example 7 was repeated except limestone was used in an amount that provided the equivalent lime. A fear that violent expulsion of carbon dioxide would occur was not realized. The X-ray pattern was similar to that of Burn Test 8.

TABLE 5
X-ray Diffraction Data for the Slag and Burns

| Burn Test No. | Sample Slag, % | Limestone, % | Temp. °F. | Substance Formed |
|---|---|---|---|---|
| Controlled condition | 100 | 0 | Room | No crystalline compounds |
| 1 | 74 | 26 | 2550 | No crystalline comppounds |
| 2 | 74 | 26 | 2300 | Gehlenite |
| 3 | 59 | 41 | 2550 | Gehlenite (major) Ca$_3$SiO$_5$ (minor) |
| 4 | 59 | 41 | 2300 | Gehlenite |
| 5 | 45 | 55 | 2700 | Portland cement minerals Free Lime |
| 6 | 31.5 | 68.5 | 2650 | Portland cement minerals |
| 7 | 31.5* | 68.5* | 2550 | Portland cement minerals Free Lime |
| 8 | 31.5* (experiment #7 melt used) | 68.5* | 2550 | Portland cement minerals |
| 9 | 31.5 | 68.5 | 2550 | Portland cement minerals Free Lime |

Note: Portland cement contains a mixture of tricalcium silicate (Ca$_3$SiO$_5$), dicalcium silicate (Ca$_2$SiO$_4$), tricalcium aluminate (Ca$_3$Al$_2$O$_6$), and tetracalcium aluminoferrite (Ca$_4$Al$_2$Fe$_2$O$_{10}$).
Gehlenite is dicalcium aluminosilicate (Ca$_2$Al$_2$SiO$_7$).
*The actual mixture was 44% slag and 56% lime. This is equivalent to 31.5% slag and 68.5% limestone, since CO$_2$ is evovled from the latter.

Data was acquired on coal ash composition by feeding lignite to a Koppers-Totsek coal gasifier. The ash existed in the gasifier in liquid form and was subjected to a water quenching chamber to form pellets ranging in size of about 5 to 10 MM. Analysis of the coal ash is shown in Table 6.

TABLE 6

| Compound | Percentage/wt. |
|---|---|
| SiO$_2$ | 41.9 |
| Al$_2$O$_3$ | 33.0 |
| CaO | 5.9 |
| SO$_3$ | 6.9 |

TABLE 6-continued

| Compound | Percentage/wt. |
|---|---|
| $Fe_2O_3$ | 10.0 |
| MgO | 1.9 |
| $TiO_2$ | 1.1 |
| $K_2O$ | 0.63 |
| NaO | 0.23 |

Fusion Point: 1,300–1,500° C.

Table 7 shows data complied on the composition of slag from a slagging gasifier taken from a Gas Council research communication, GC 112, "Further Experiments with a Slagging Pressure Gasifier," published in November 1964, page 14.

Table 7

| The Composition of Coal, Ash, Flux and Slag (percent/wt.) | | | | | |
|---|---|---|---|---|---|
| Test No. | 67 | | | 72 | |
| | Coal Ash | Blast Furnace Slag | Slag | Coal Ash | Dolomite | Slag |
| $Al_2O_3$ | 28.5 | 20.6 | 26.5 | 32.4 | 2.18 | 30.3 |
| $SiO_2$ | 38.6 | 35.4 | 38.7 | 47.0 | 0.86 | 43.7 |
| $Fe_2O_3$ | 15.6 | 1.63 | 6.7 | 4.52 | 1.07 | 2.94 |
| Fe | 0.0 | 0.0 | 1.95 | 0.0 | 0.0 | 0.91 |
| $TiO_2$ | 1.22 | 0.73 | 1.12 | 0.95 | 0.04 | 0.87 |
| $Mn_3O_4$ | 0.22 | 1.26 | 0.81 | 0.20 | 0.18 | 0.19 |
| $P_2O_1$ | 0.49 | 0.12 | 0.31 | 1.25 | 0.17 | 0.24 |
| $Na_2$ | 1.09 | 1.53 | 0.88 | 2.14 | 0.08 | 1.62 |
| $K_2O$ | 1.38 | 1.26 | 1.40 | 0.80 | 0.12 | 0.67 |
| CaO | 5.71 | 33.1 | 16.8 | 5.95 | 30.2 | 12.3 |
| MgO | 2.06 | 6.15 | 3.73 | 1.70 | 21.6 | 7.74 |
| $SO_3$ | 6.21 | 1.0 | 0.83 | 3.49 | 0.01 | 0.24 |
| $CO_2$ | 0.0 | 0.0 | 0.0 | 0.0 | 47.2 | 0.0 |
| Carbon | 0.0 | 0.0 | 0.32 | 0.0 | 0.0 | 0.53 |

I claim:

1. A manufacturing process for converting coal ash slag from a slagging coal gasifier into a marketable cement product having the characteristics and qualities of portland cement, which process comprises the steps of: transferring molten bituminous, semi-bituminous or lignitic noncoking coal slag having a temperature range between approximately 2800° F. and 3600° F. from a slagging coal gasifier to a melt chamber, reacting a preheated mineral containing lime with said slag in the ratio of 1 part slag to 1.2 to 4 parts of said mineral containing lime to form a homogeneous cement product having a temperature range between approximately 2200° F. and 2800° F., transferring said cement product to a quench chamber where said product cools and solidifies in the form of clinkers, and reducing said clinkers to powder form.

2. The process as recited in claim 1 wherein said mineral containing lime is calcium oxide.

3. The process recited in claim 1 wherein said mineral containing lime is calcium hydroxide.

4. The process recited in claim 1 wherein said mineral containing lime is calcium carbonate.

5. The process as recited in claim 1 wherein said ratio of slag to mineral containing lime is 1 part of slag to 2.5 parts of said lime containing material.

6. A manufacturing process for converting coal ash slag from a slagging coal gasifier into a marketable cement product having the characteristics and qualities of portland cement, which process comprises the steps of:

(a) transferring molten bituminous, semi-bituminous or lignitic noncoking coal slag from a slagging coal gasifier to a melt chamber;

(b) reacting a preheated mineral containing lime, such as calcium oxide, calcium hydroxide or calcium carbonate, with said molten slag in said melt chamber in the ratio of about 1 part of slag to 1.2 to 4 parts of said mineral containing lime to form a conglomerate;

(c) stirring said conglomerate until a homogeneous cement product is formed;

(d) transferring said cement product to a quench chamber where said product cools and solidifies in the form of clinkers;

(e) adding a set regulating additive to said clinkers, and (f) reducing said composition to powder.

7. The process as recited in claim 6 wherein said set regulating additive is gypsum.

8. The process as recited in claim 6 wherein said set regulating additive is anhydrite.

* * * * *